United States Patent
Ydrén et al.

(10) Patent No.: US 10,471,921 B2
(45) Date of Patent: Nov. 12, 2019

(54) AIRBAG UNIT FOR A MOTOR VEHICLE SAFETY DEVICE AND A RELATED METHOD OF PACKAGING AN AIRBAG

(71) Applicants: Karin Ydrén, Vara (SE); Dan Persson, Lagos (PT); Nathalie Ducrocq, Göteborg (SE)

(72) Inventors: Karin Ydrén, Vara (SE); Dan Persson, Lagos (PT); Nathalie Ducrocq, Göteborg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 74 days.

(21) Appl. No.: 15/567,794

(22) PCT Filed: Apr. 15, 2016

(86) PCT No.: PCT/EP2016/058399
§ 371 (c)(1),
(2) Date: Oct. 19, 2017

(87) PCT Pub. No.: WO2016/169854
PCT Pub. Date: Oct. 27, 2016

(65) Prior Publication Data
US 2018/0148012 A1     May 31, 2018

(30) Foreign Application Priority Data
Apr. 20, 2015   (EP) .................................. 15164315

(51) Int. Cl.
*B60R 21/217* (2011.01)
*B60R 21/201* (2011.01)

(52) U.S. Cl.
CPC ........ *B60R 21/2176* (2013.01); *B60R 21/201* (2013.01)

(58) Field of Classification Search
CPC .......................... B60R 21/2176; B60R 21/201
See application file for complete search history.

(56) References Cited

U.S. PATENT DOCUMENTS

| | | | |
|---|---|---|---|
| 5,234,227 A * | 8/1993 | Webber | B60R 21/2171 280/728.1 |
| 5,441,299 A | 8/1995 | Lauritzen et al. | |
| 5,531,477 A * | 7/1996 | Madrigal | B60R 21/201 280/743.1 |
| 5,628,527 A | 5/1997 | Olson et al. | |

(Continued)

FOREIGN PATENT DOCUMENTS

EP       2594441 A1      5/2013

OTHER PUBLICATIONS

International Search Report and Written Opinion of the ISA for PCT/EP2016/058399, ISA/EP, Rijswijk, NL, dated Jun. 10, 2016.

*Primary Examiner* — Drew J Brown
(74) *Attorney, Agent, or Firm* — Stephen T. Olson; Harness, Dickey & Pierce, P.L.C.

(57) ABSTRACT

An airbag unit for a motor vehicle safety device includes an inflatable airbag formed of flexible material and provided in a rolled and/or folded package. The inflatable airbag is held under compression by a cover extending around at least part of the package. The cover is formed of a molded pulp material and is configured to impart a predetermined stable shape to the unit. A method of packaging an airbag in such a manner is also disclosed.

20 Claims, 11 Drawing Sheets

(56) References Cited

U.S. PATENT DOCUMENTS

| | | | | |
|---|---|---|---|---|
| 5,823,566 A * | 10/1998 | Manire | ................ | B60R 21/201 |
| | | | | 280/728.3 |
| 6,145,879 A * | 11/2000 | Lowe | ..................... | B60R 21/20 |
| | | | | 280/743.1 |
| 6,422,589 B1 * | 7/2002 | Ostermann | ......... | B60R 21/2171 |
| | | | | 280/728.2 |
| 2003/0159875 A1 * | 8/2003 | Sato | ....................... | B60R 21/36 |
| | | | | 180/274 |
| 2003/0184057 A1 * | 10/2003 | Kumagai | ............. | B60R 21/201 |
| | | | | 280/728.3 |
| 2005/0067209 A1 * | 3/2005 | Yoshikawa | ........ | B60N 2/42718 |
| | | | | 180/271 |
| 2007/0241541 A1 * | 10/2007 | Miwa | .................. | B60R 21/201 |
| | | | | 280/728.2 |
| 2011/0260432 A1 * | 10/2011 | Matsushima | ......... | B60R 21/201 |
| | | | | 280/730.2 |
| 2015/0108741 A1 * | 4/2015 | Ostman | ................ | B60R 21/201 |
| | | | | 280/728.3 |
| 2018/0236965 A1 * | 8/2018 | Fischer | ................ | B60R 21/237 |

\* cited by examiner

AIRBAG UNIT FOR A MOTOR VEHICLE SAFETY DEVICE AND A RELATED METHOD OF PACKAGING AN AIRBAG

CROSS-REFERENCE TO RELATED APPLICATIONS

This application is a 371 U.S. National Stage of International Application No. PCT/EP2016/058399, filed Apr. 15, 2016. This application claims the benefit of and priority to European Patent Application No. 15164315.2, filed Apr. 20, 2015. The disclosures of the above applications are incorporated herein by reference.

FIELD

The present invention relates to an airbag unit for a motor vehicle safety device, and an associated method of packaging an airbag for a motor vehicle safety device.

BACKGROUND

It is now very well known to provide motor vehicles with one or more inflatable airbags to provide protection to the occupants, and also in some arrangements to pedestrians, in the event of an accident involving the motor vehicle. Typically, such airbags are formed from flexible fabric, although some arrangements use other flexible sheet material such as plastics material. Airbags can take various forms such as, for example; so-called driver airbags which typically inflate from within the hub of the motor vehicle's steering wheel to provide protection to the driver of the vehicle in the event of a frontal impact; inflatable curtains arranged to deploy downwardly inside the windows of the motor vehicle to protect occupants in the event of side impacts or rollover accidents; and side airbags arranged to deploy between an occupant of the vehicle and a side panel of the vehicle in order to protect the occupant in the event of a side impact. Of course many other types of airbags are also known, and the present invention is not limited to any particular type of airbag.

Modern motor vehicles are now often designed with very little available space for the mounting of packaged airbags. This can be for a variety of reasons such as aesthetic considerations and for reasons of comfort and convenience to occupants of the vehicle. It is therefore becoming increasingly important to produce very tightly packaged airbags which, in their un-deployed rolled and/or folded configuration, take up very little space within the vehicle, thereby permitting more convenient and imaginative designs of interior trim or seats (for example in the case of side airbags which typically deploy from inside the structure or upholstery of a vehicle seat).

It is also considered convenient to provide such packaged airbags in the form of pre-formed modules or units which can then easily be installed in the motor vehicle during assembly on the production line. Whilst some airbags are commonly packaged within soft covers (for example made from pliable fabric), these have not previously been considered suitable for installations requiring a carefully shaped module or unit because the soft nature of such covers has precluded the provision of a sufficiently accurately shaped or stable enclosure for the airbag. Therefore, airbag units requiring a stable and accurate shape typically comprise a hard plastic cover provided around the airbag in order to retain the airbag in its tightly packaged condition and to facilitate convenient and reliable installation of the unit in a motor vehicle. However, such covers add significantly to the cost and weight of the airbag unit, and also add extra bulk to the packaged airbag which makes it difficult to produce airbag units of sufficiently small size for installation in modern vehicles without compromising the interior design aesthetics of the vehicle.

Additionally, the use of a higher proportion of recyclable and/or renewable materials is becoming increasingly important in the automotive industry. It is conventional to produce airbag covers from polymeric materials which can thus be considered disadvantageous from this point of view.

SUMMARY

It is therefore an object of the present invention to provide an improved airbag unit for a motor vehicle safety device. It is another object of the present invention to provide an improved method of packaging an airbag for a motor vehicle safety device.

According to a first aspect of the present invention, there is provided an airbag unit for a motor vehicle safety device, the unit comprising: an inflatable airbag formed of flexible material and provided in a rolled and/or folded package, the package being held under compression by a cover which extends around at least part of the package, the airbag unit being characterised in that said cover is formed of a moulded pulp material and is configured to impart a predetermined stable shape to the unit.

According to another aspect of the present invention, there is provided a method of packaging an airbag for a motor vehicle safety device, the method comprising the steps of: providing an inflatable airbag formed of flexible sheet material; rolling and/or folding the airbag; providing a cover of moulded pulp material around at least part of the rolled and/or folded airbag via simultaneous application of heat and pressure to form a compressed package having a stable shape defined by said moulded pulp material.

Preferably, the method further includes the steps of: at least partially enclosing the rolled and/or folded airbag within an initially flexible cover formed of semi-pulp material containing moisture to form an intermediate package; and then simultaneously heating and pressing the intermediate package to eliminate said moisture and impart said stable shape to the resulting compressed package.

Advantageously, the method further includes the step of placing the intermediate package in a mould cavity prior to said step of simultaneously heating and pressing the intermediate package, and wherein said step of simultaneously heating and pressing is performed on the intermediate package within said mould cavity.

Conveniently, the method further includes applying a vacuum to said mould cavity during said step of simultaneously heating and pressing.

Preferably, said moulded pulp material is derived from at least one renewable source.

Advantageously, said moulded pulp material comprises cellulose fibres.

Conveniently, said moulded pulp material comprises recycled paper.

Optionally, said moulded pulp material comprises natural fibres.

Preferably, said cover contains no polymeric material.

Advantageously, said cover has a water-resistant or waterproof coating.

DETAILED DESCRIPTION OF THE DRAWINGS

So that the invention may be more readily understood, and so that further features thereof may be appreciated, embodiments of the invention will now be described by way of example with reference to the accompanying drawings in which.

Figure 2:
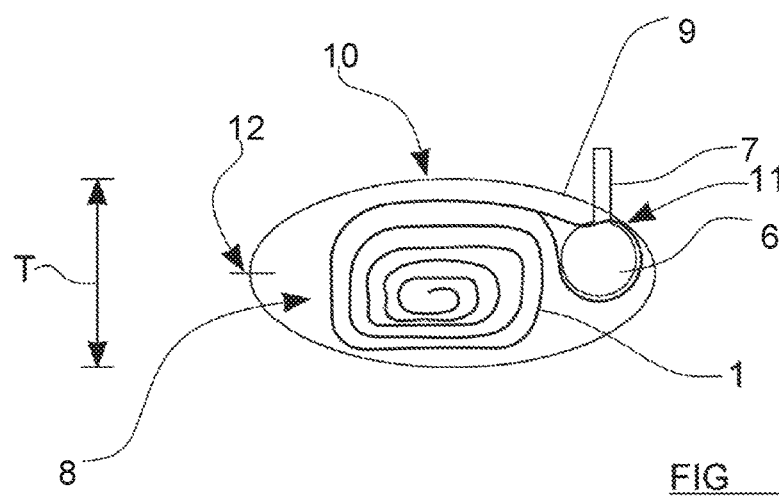
FIG. 2 is a schematic cross-sectional illustration showing the airbag of FIG. 1 in a rolled configuration and wrapped with a flexible sheet to form an intermediate package.
Figure 5:
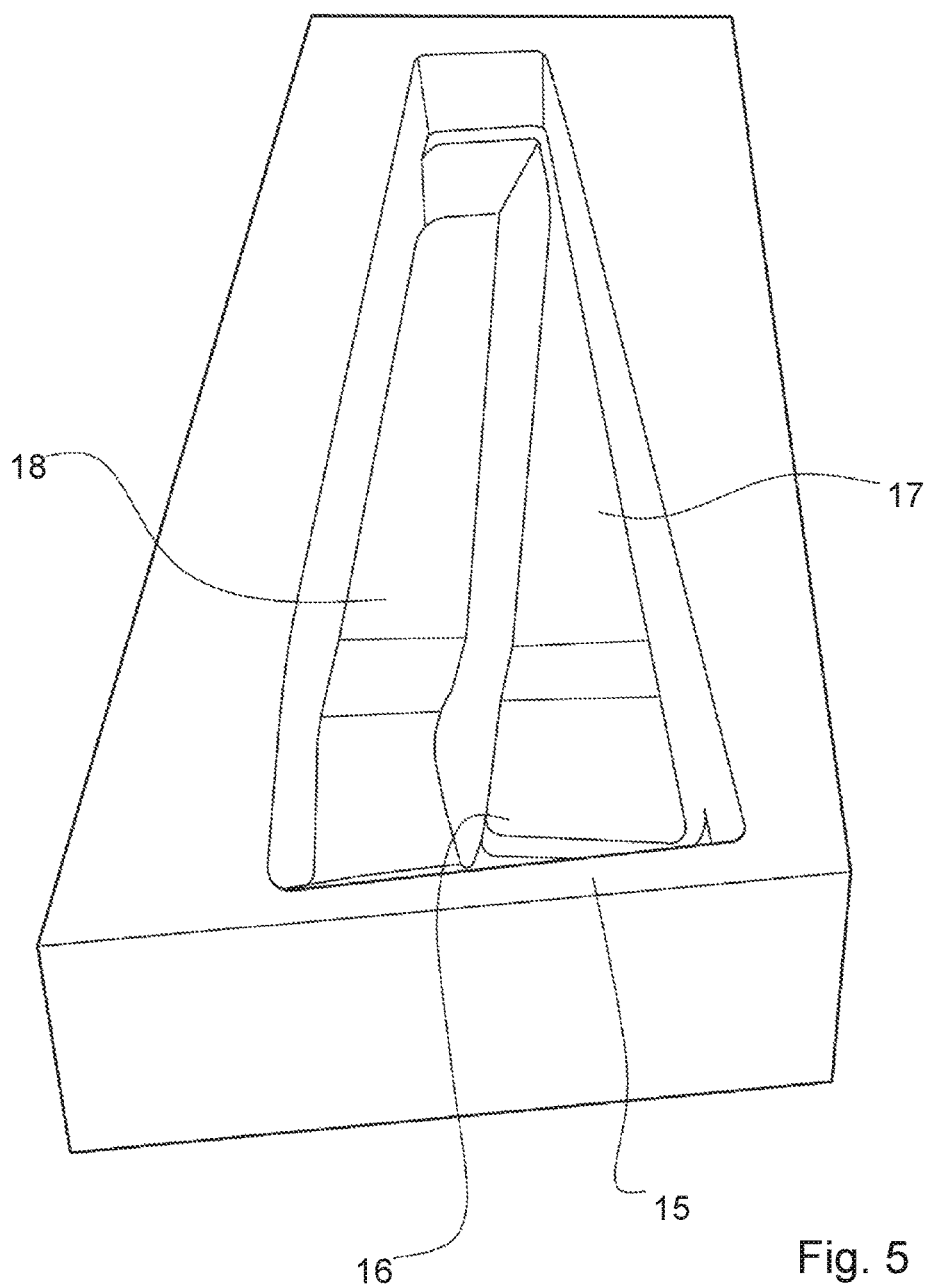
FIG. 5 is a perspective view of a pressing member having a mould cavity which can be used in the method of the present invention.
Figure 6:
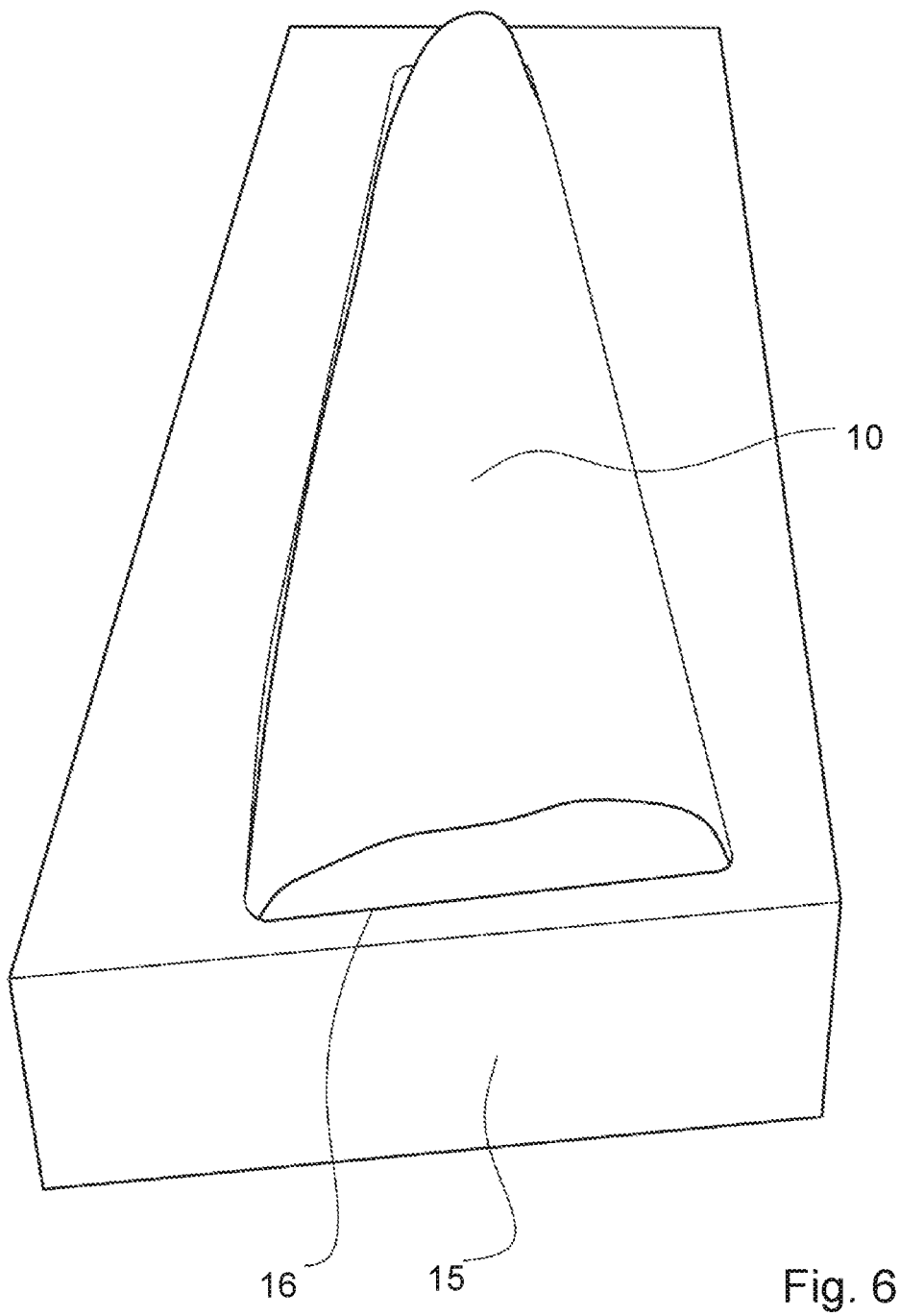
FIG. 6 shows a rolled airbag, wrapped with the flexible material and formed into an intermediate package received in the mould cavity of the pressing member shown in FIG. 5.
Figure 10:
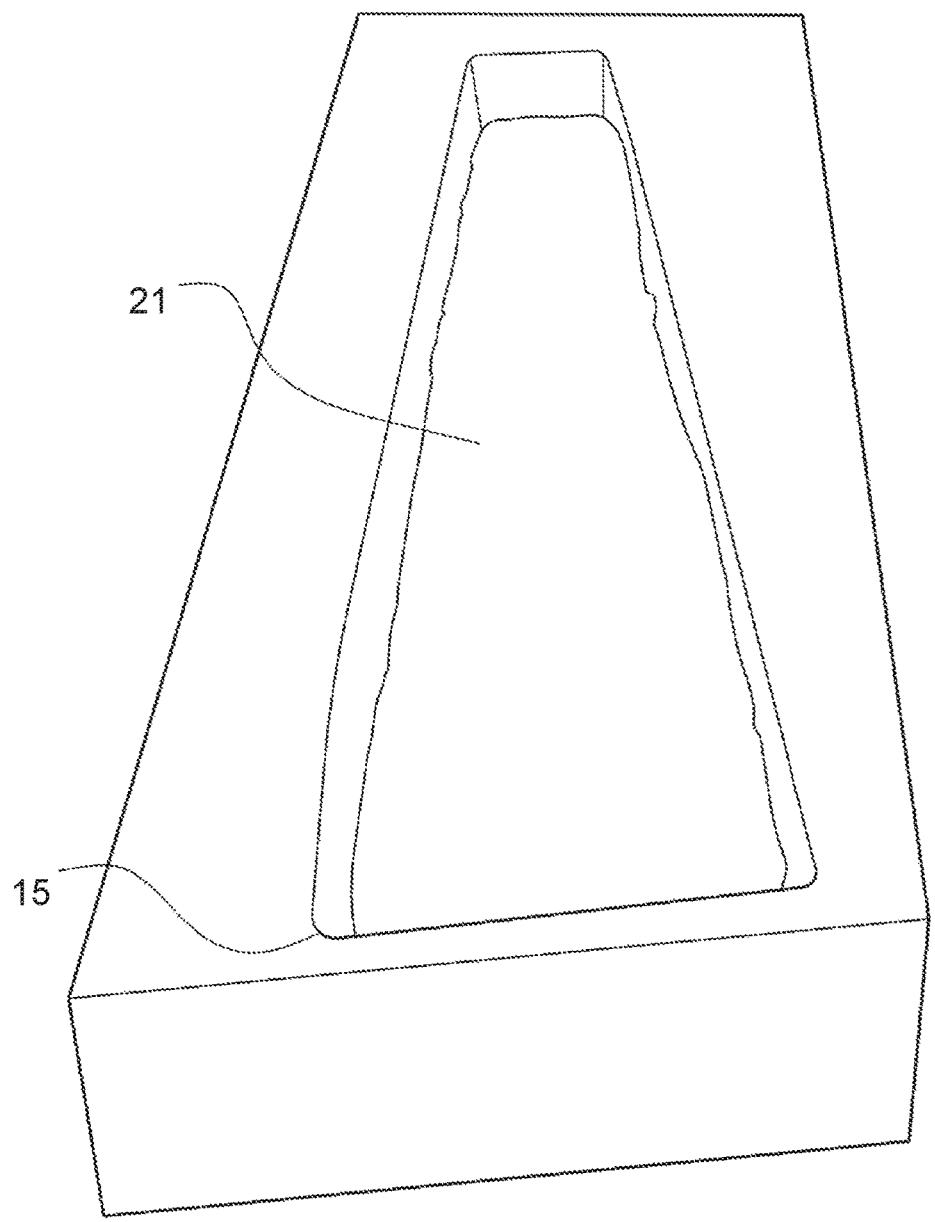
Figure 11:
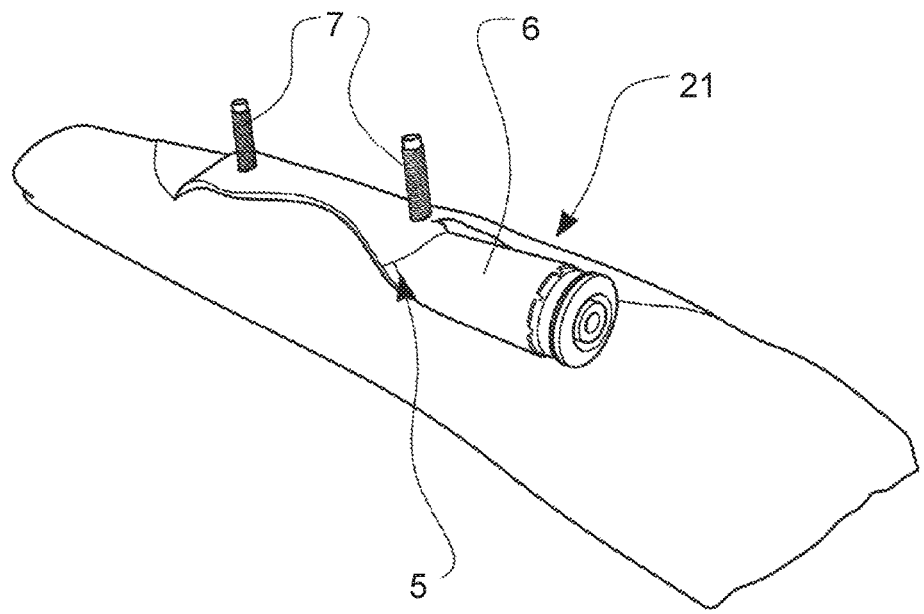
Figure 12:
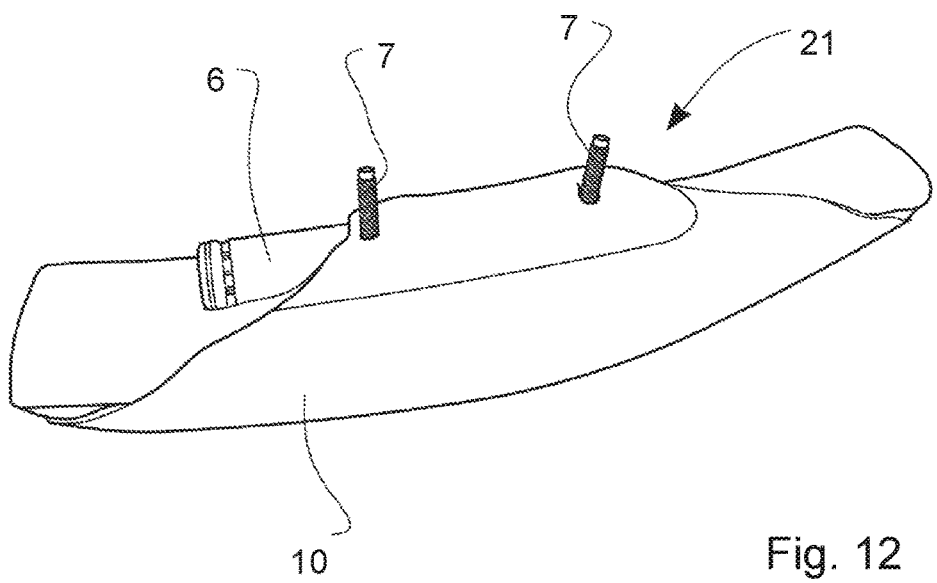
Figure 13:
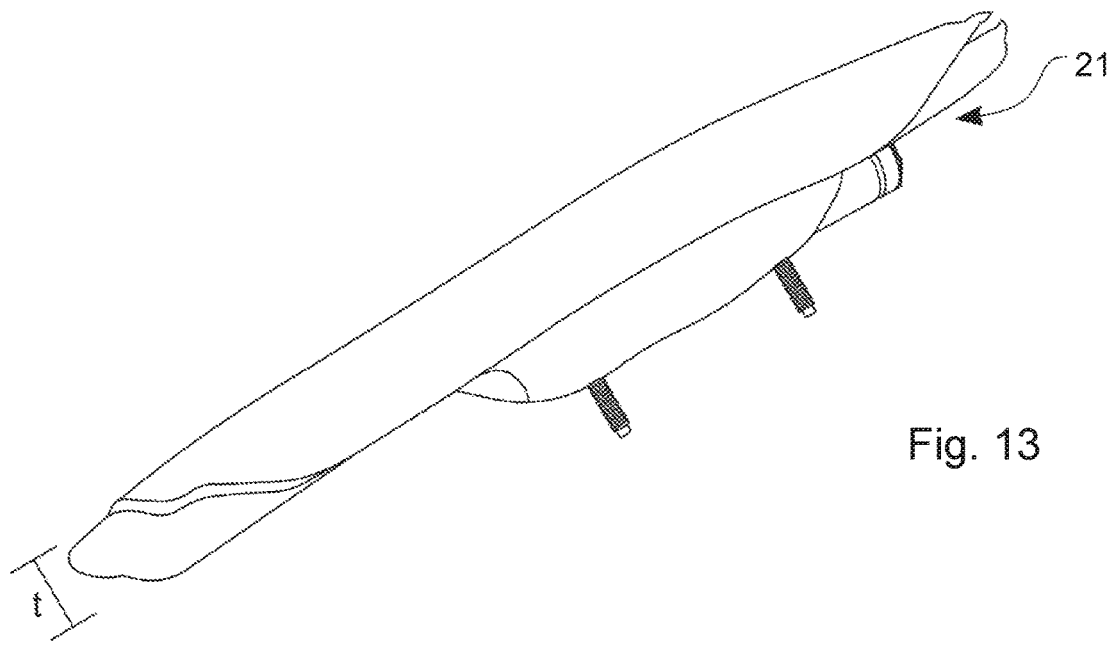
Figure 14:
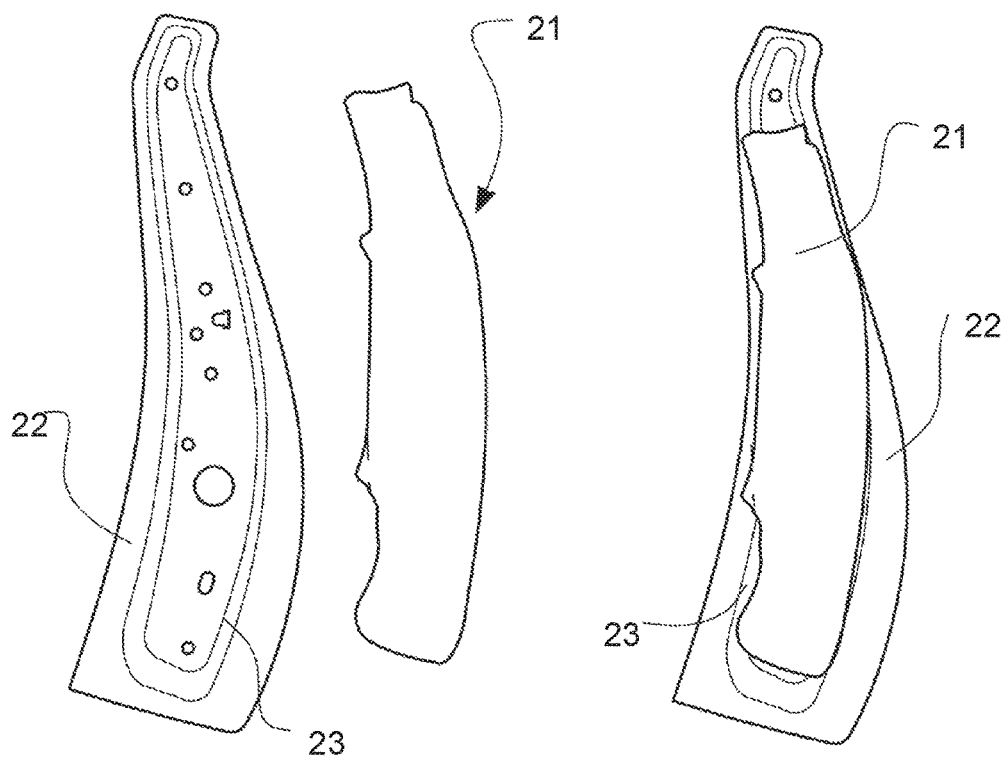
Figure 15:
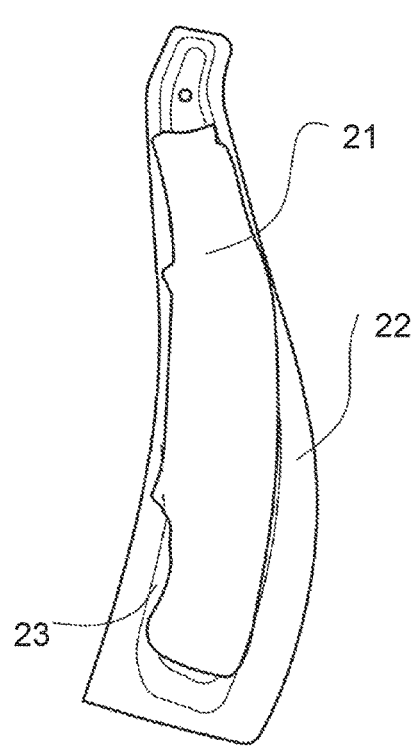
Figure 16:
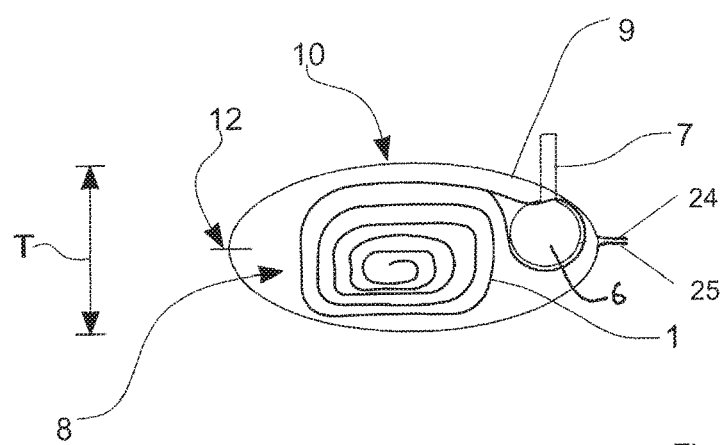
Figure 17:
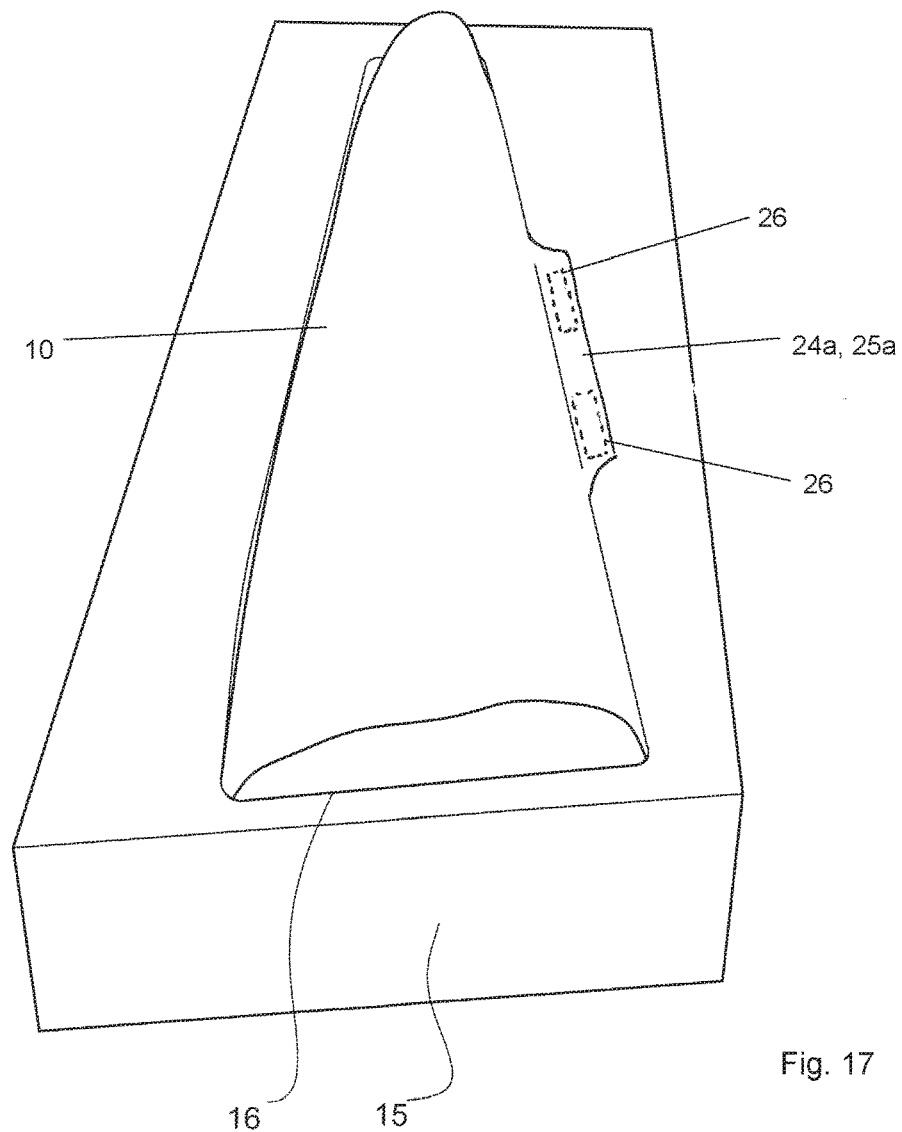
Figure 18:
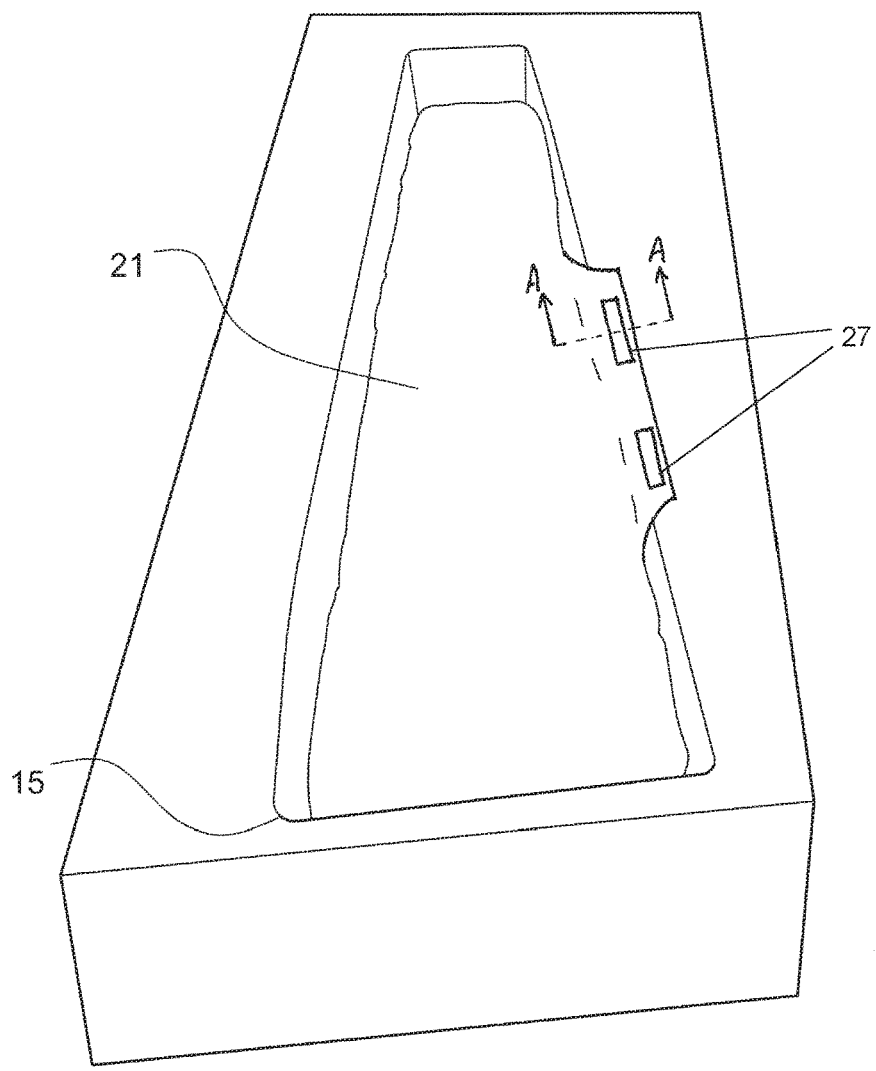
Figure 19:
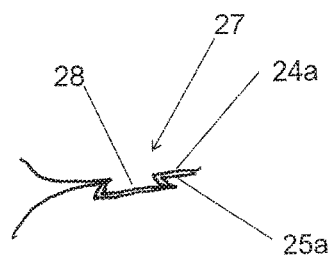

FIG. 10 a view corresponding generally to that of FIG. 5, but which shows the airbag in a subsequent compressed package following simultaneous heating and pressing of the intermediate package;

FIG. 11 is a perspective view of a finished airbag unit in accordance with the present invention;

FIG. 12 is another perspective view of the finished airbag unit;

FIG. 13 is yet another perspective view of the finished airbag unit;

FIG. 14 is a plan view showing the airbag unit alongside part of a vehicle seat frame to which the airbag unit is intended to be mounted;

FIG. 15 is a view similar to that of FIG. 14, but which shows the airbag unit mounted to the seat frame;

FIG. 16 is a view similar to that of FIG. 2, but which shows the formation of an alternative configuration of the intermediate package;

FIG. 17 is a view similar to that of FIG. 6, showing the intermediate package of FIG. 16 received within a mould cavity of the pressing member;

FIG. 18 is a view corresponding generally to that of FIG. 17, but which shows the airbag in a subsequent compressed package following simultaneous heating and pressing of the intermediate package; and FIG. 19 is an enlarged cross-sectional view taken along line A-A in FIG. 18, showing a mechanical interconnection between respective edge regions of the cover of the airbag package.

DETAILED DESCRIPTION

Figure 1:
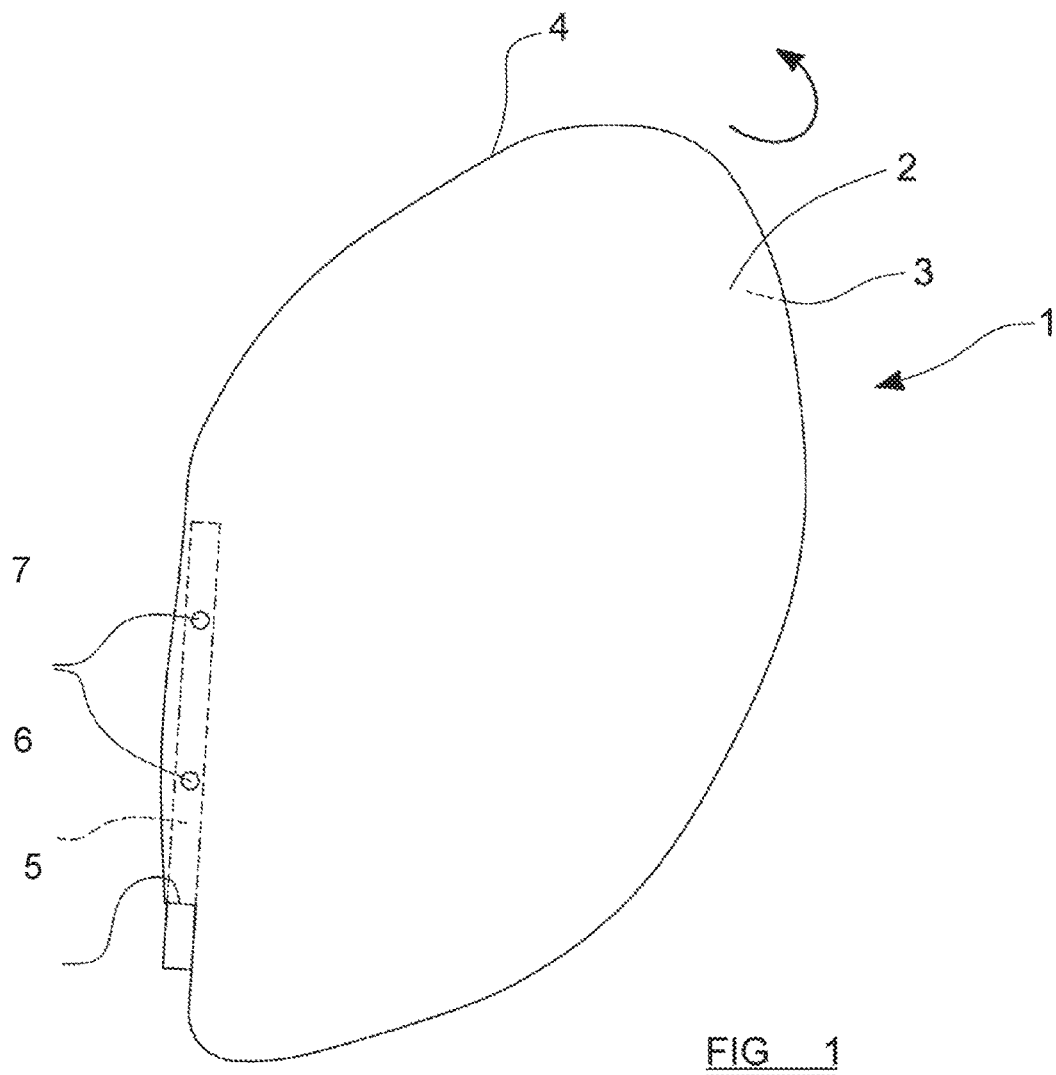
FIG. 1 is a schematic plan view of an unfolded exemplary airbag suitable for packaging via the method of the present invention.

Referring initially to FIG. 1, there is shown an airbag 1 suitable for use in the method of the present invention. The particular airbag 1 illustrated is a so-called side-airbag of a type intended to be installed in the side of a vehicle seat for deployment between the seat occupant and a side door or panel of the motor vehicle. However, it is to be appreciated that the present invention is not restricted to side-airbags of the type illustrated, and indeed could be used to package airbags of any type. Indeed, it has been found that airbag units and the method of the present invention offer significant advantages to airbags of the inflatable curtain type, as will be explained in more detail below. Furthermore, it should also be appreciated that the airbag 1 illustrated is shown in a basic form to illustrate clearly the general concept of the invention. Other more complex airbag configurations may also be packaged via the method of the present invention.

The airbag 1 may be formed from two substantially identical sheets of flexible material 2, 3, such as woven fabric, which are superimposed on one another and interconnected around their aligned edges by a peripheral seam 4 to define a large internal inflatable volume between the sheets for the receipt of inflating gas from an inflator such as a gas generator.

As will be appreciated by those of skill in the art of airbag manufacture, although the airbag 1 has been described above as being formed from two separate sheets 2, 3 of flexible material, it is envisaged that in variants of the invention the airbag could be formed from a single sheet of flexible material, the sheet being folded in half to create two superimposed layers which can then be interconnected by a peripheral seam in an otherwise similar manner to that described above with reference to FIG. 1. It is also envisaged that in some embodiments the two sheets 2, 3 could be woven simultaneously via a so-called "one-piece weaving" technique, known per se, in which the warp and weft yarns forming the two layers are interwoven in selected areas to form an interconnecting peripheral seam which is integral to the woven structure of the two sheets.

The fabric from which the airbag 1 is constructed may be a plastic fabric, for example a fabric formed by weaving together warp and weft yarns of polyamide fibres. The fabric may be provided with a coating of thermoplastic material.

The airbag 1 is formed so as to have an opening 5 for insertion of the inflator 6 into the inflatable volume of the airbag. FIG. 1 shows a cylindrical inflator 6 in its installed position in which the inflator extends through the opening 5 such that its major extent lies within the inflatable volume of the airbag. A short length of the inflator projects outwardly from the airbag through the opening 5 to facilitate electrical connection of a control cable. As is conventional, the inflator has a pair of outwardly extending mounting spigots 7 which project outwardly through respective apertures formed in the fabric of one of the sheets 2, and which are configured to be mounted to the structure of a vehicle seat, thereby anchoring the airbag in position against the seat.

In order to package the airbag 1 ready for installation in the vehicle, the airbag 1 is initially rolled and/or folded into a small package 8 as illustrated schematically in FIG. 2. The particular package 8 illustrated in FIG. 2 is created by rolling the airbag 1 towards the inflator 6 to create a rolled package comprising a monotonous roll. It is to be noted, however, that the package 8 could alternatively be formed by folding the airbag 1, or by creating two or more rolls in the airbag, or even via a combination of rolling and folding the airbag, each of which techniques are known per se. In the case of a rolling technique, the airbag 1 may be rolled around a mandrel (not shown) which may then be withdrawn from the resulting package along its axis.

The rolled and/or folded airbag 1 of the package 8 is wrapped in, or otherwise enclosed within, a flexible cover 9 to create an intermediate package 10. The cover 9 may be configured to form a simple band around the airbag, such that end regions of the airbag package 8 protrude from the sides of the band. However, it is envisaged that in most embodiments the cover 9 will substantially completely encapsulate the airbag package 8. In its simplest form, the cover 9 can be simply folded around and over the airbag package 8, such that respective edge regions of the cover material lie loosely against one another, for example as shown at 11 in FIG. 2. However, for convenience in preventing the package 8 and cover 9 from unravelling, the folds or regions of the cover material can be held in position by a simple tack stitch or the like, noting that any such tack stitch will not contribute significantly to the integrity of the finished airbag unit.

The complete intermediate package 10, comprising the airbag 1 and the flexible cover 9 has an initial cross-sectional thickness T.

The cover 9 may be provided with a predefined tear-seam 12, such as a line of perforations. As will be appreciated by those of skill in the art of airbag manufacture, the tear seam 12 is configured to rupture upon inflation of the airbag 1 in order to permit the airbag to burst through the cover 9 in the event of airbag deployment in a crash situation.

Figure 3:
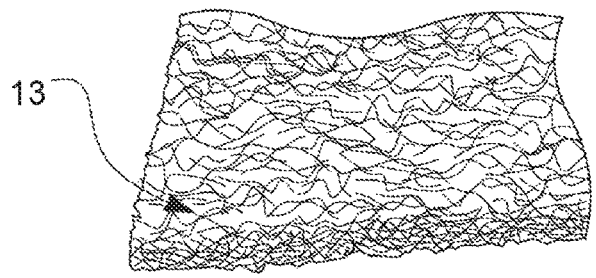
FIG. 3 is a perspective view of the material from which the flexible sheet shown in FIG. 2 is made, the material being shown in an initial condition prior to processing by subsequent steps of the method.
Figure 4:
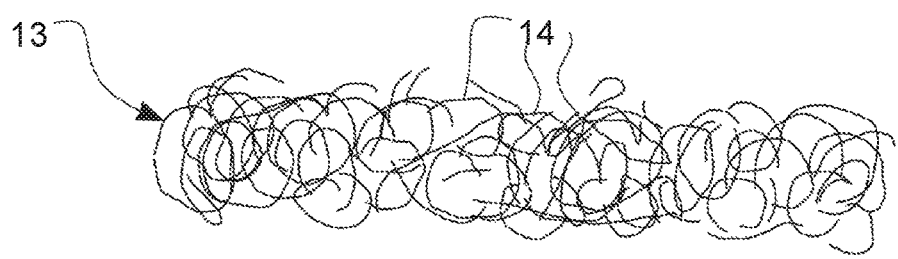
FIG. 4 is a schematic illustration showing the arrangement of fibres in the material shown in FIG. 3.

The material of the cover 9 may be provided in the initial form of a flexible sheet of semi-pulp material 13 comprising a plurality of fibres 14 and a degree of inherent water moisture. The semi-pulp sheet material 13 may be formed from a slurry of fibres 14 which are entangled with one another in a random or quasi-random manner, the slurry having been pressed to drive out a significant amount of moisture, but to leave some remaining, such that the semi-pulp sheet material 13 is sufficiently stable to remain intact whilst remaining flexible and moist. FIG. 3 shows a region of the semi-pulp sheet 13 in its natural condition under atmospheric conditions and prior to subsequent processing steps in accordance with the method of the present invention, whilst FIG. 4 is a schematic illustration showing the manner in which the constituent fibres 14 of the material 13 are entangled with one another in a random or quasi-random manner.

Various different types of fibres 14 can be used to form the semi-pulp sheet material 13 such as, for example, fibres of recycled paper or cardboard, cellulose fibres, natural fibres such as wood, sugar cane, wheat straw, bulrush or palm, or any combination thereof. Preferably, the fibrous material will be taken from a renewal source.

FIG. 5 illustrates a solid press member 15 which may be formed, for example, from cast metal. The press member 15 has a recess defining a mould cavity 16 of three-dimensional form. In the particular press member 15 illustrated in FIG. 5, it will be noted that the mould cavity 16 is stepped so as to define a first relatively shallow part 17, and a second relatively deep part 18.

Figure 7:
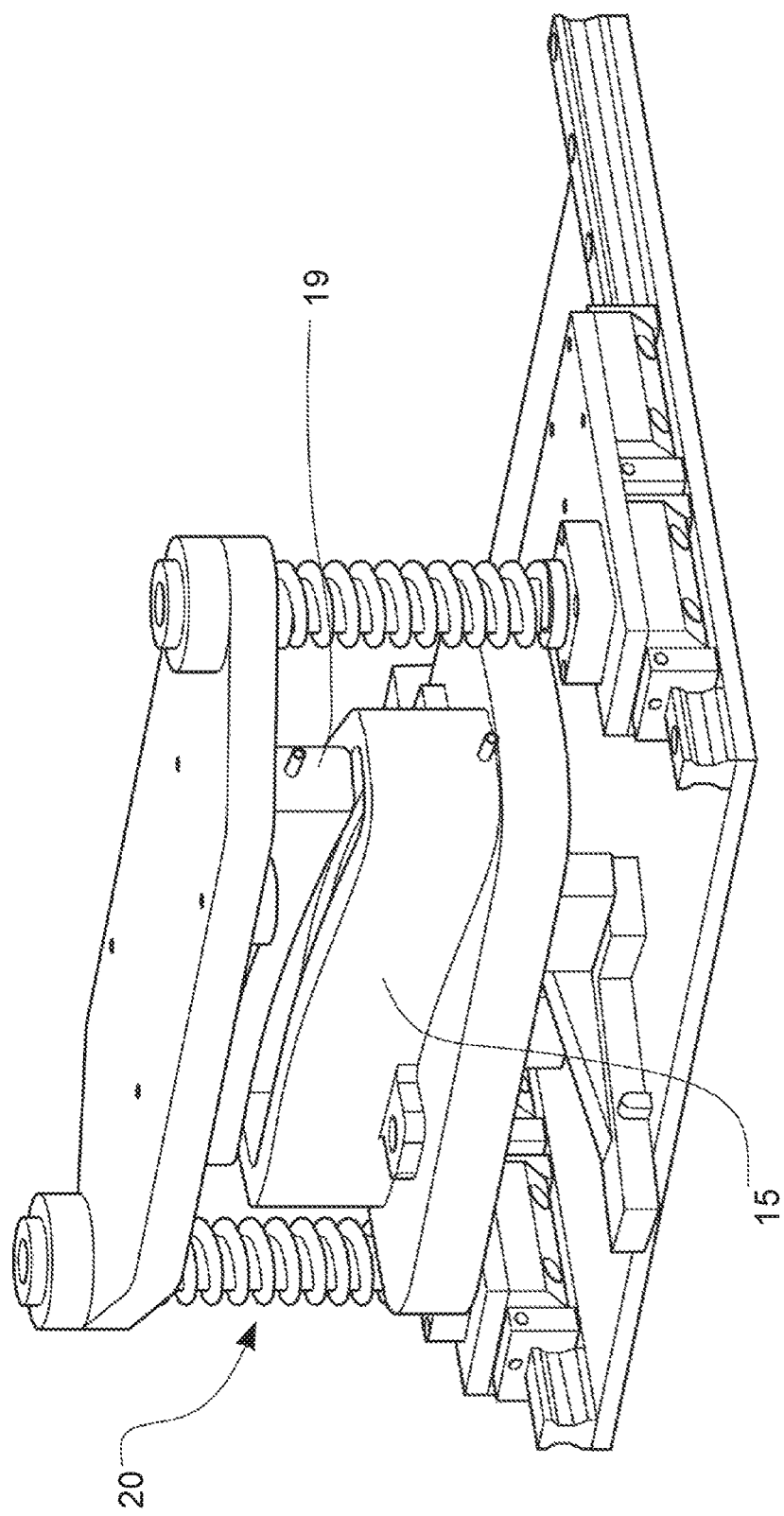
FIG. 7 shows a press used to compress the intermediate package within the mould cavity shown in FIG. 5.

As illustrated in FIG. 6, the intermediate package 10 formed by enclosing the rolled and/or folded airbag package 8 in the semi-pulp cover 9 is placed inside the mould cavity 16 in the press member 15. As illustrated in FIG. 7, the press member 15 is then positioned below another press member 19 in a press apparatus 20 which may be, for example, an industrial hydraulic press apparatus. The upper press member 19 is sized and configured to fit slidingly within the lower press member 15 holding the intermediate package 10, such that actuation of the press apparatus 20 is effective to drive the upper press member 19 into the mould cavity 16 of the lower press member 15, to thereby compress the intermediate package 10 and thus drive the remaining moisture out of the cover 9. The upper press member 19 may be configured such that its undersurface has a three-dimensional profile conforming to a desired shape for the finished airbag unit.

The press apparatus 20 is actuated whilst the intermediate package 10 is heated, for example by being placed within an oven, to a temperature which is sufficient to evaporate moisture in the semi-pulp sheet material 13, thereby helping to ensure that substantially no moisture remains in the material after the pressing step. Alternatively, it is possible to heat the intermediate package 10 by pre-heating the press apparatus before the intermediate package is placed in it, such that the intermediate package 10 will thereby be heated from the press apparatus 20. In some embodiments, it may be appropriate to place the intermediate package 10 within a fixture which will be placed in the press-apparatus 20.

As will be appreciated, the intermediate package 10 is thus simultaneously heated and pressed in the method of the present invention, although it is to be noted in this regard that it is not essential for the heat and pressure to be applied to the package 10 at precisely the same instant in time. For example, it is envisaged that the heat may be applied before the application of pressure to the intermediate package 10; the important aspect being that there is at least a period of time during which both heat and pressure are applied to the intermediate package The press 20 may be operated to apply a pressing force of between 5 and 200 kN to the intermediate package 10, whilst the temperature is held at a predetermined elevated level. The time period during which the intermediate package 10 is simultaneously heated and pressed will depend on the nature of the cover material, but it is envisaged that it will be as short as possible to allow efficient manufacture of the airbag unit.

In some embodiments of the method, the lower press member 15 may be provided with a series of liquid drainage channels (not shown) to permit the moisture pressed out of the intermediate package to be directed away from the package. Also, it is possible to apply a vacuum to the mould cavity 16 in order to draw moisture away from the cover 9 of the intermediate package 10 more rapidly.

As will be appreciated, the compression applied to the intermediate package 10 by the press 20 is effective to conform the intermediate package 10, on account of the flexible nature of the airbag 1 and the initially flexible nature of the cover 9, to the profile of the mould cavity 16 and the undersurface of the upper press member 19. The intermediate package 10 is urged into a three-dimensional shape defined by the shape of the mould cavity 16 and the profile of the undersurface of the upper press member 19.

In the case that the airbag 1 is formed of plastic fabric, the simultaneous application of pressure and heat to the intermediate package 10 causes the fabric of the airbag 1 to plastically deform as it is compressed. The rolled airbag 1 within the intermediate package 10 thus flattened, with clearly defined creases being formed which will persist after the airbag is subsequently cooled.

Figure 8:
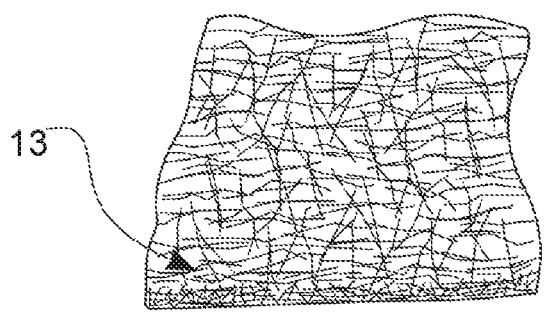
FIG. 8 shows the material of the cover in a condition arising after simultaneous heating and pressing of the intermediate package in the press of FIG. 6.
Figure 9:
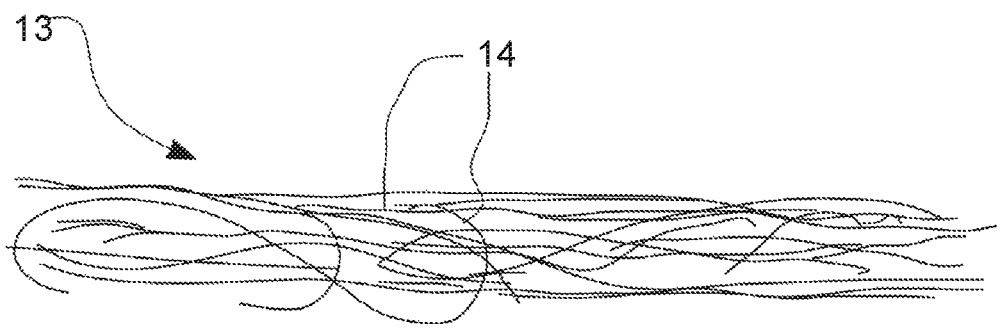
FIG. 9 is a schematic illustration showing the arrangement of fibres in the heated and pressed material shown in FIG. 8.

However, even in the case that the airbag 1 is not formed of plastically deformable material, the simultaneous application of heat and pressure to the intermediate package 10 will in any event cause the material of the cover 9 to adopt the shape of the mould cavity, with its fibres 14 being compressed together such that the material becomes thinner and adopts the compressed configuration illustrated in FIGS. 8 and 9.

FIG. 10 shows the compressed package 21 which is formed from the intermediate package 10 via the above-described process, within the mould cavity 16 following subsequent opening of the press 20, the compressed package 21 defining an airbag unit made via the method of the present invention.

The step of simultaneously heating and compressing the material 13 of the cover 9 will remove substantially all of the initial moisture content of the material such that the cover 9 will effectively then be transformed into a moulded pulp, which can be considered similar, for example, to the type of moulded pulp which is commonly used to form egg boxes and disposable packaging. Accordingly, the resulting cover 9 will be sufficiently rigid, and have sufficient stability to retain the pressed three-dimensional shape imparted to the intermediate package 10 by the press 20 when the compressed package 21 is subsequently removed from the press when the step of simultaneous heating and pressing is complete. The cover 9 of moulded pulp is thus effective to retain the rolled airbag 1 inside it in compression arising from the pressing step.

FIGS. 11 to 13 show various different views of a finished airbag unit 21 made via the above-described method. The airbag unit 21 is shown in the condition in which it is removed from the mould cavity 16 after the simultaneous heating and pressing step. For some airbag installations in motor vehicles, it is envisaged that no further finishing will be required. However, for other installations it might be necessary to ensure that the moulded pulp material of the cover 9 has at least a degree of water resistance. It is therefore possible to apply a water-resistant or water-proof coating to the outer surface of the cover 9, for example by spraying a wax coating over the cover 9. As will be noted, the airbag unit 21 has a cross-sectional thickness t which is reduced relative to the initial cross-sectional thickness T of the intermediate package 10.

The resulting moulded pulp configuration of the cover 9 is effective to maintain the shape of the airbag unit 21 when it is removed from the mould cavity 16, the shape of the airbag unit 21 thus being stable. However, the moulded pulp material will retain a small degree of flexibility. As will be noted, the airbag 1 is very tightly packed inside the cover 9, and the moulded pulp cover 9 itself is thin.

FIG. 14 shows the exemplary airbag unit 21 alongside a backrest side-frame 22 of a vehicle seat structure. The side frame 22 has a curved recess 23 provided in its outwardly directed surface. The airbag unit 21 made via the above-described method can be shaped and sized so as to fit neatly inside the recess 23 in the side-frame 222, as shown in FIG. 15.

As will be appreciated, the above-described method of producing an airbag unit 21 allows airbags to be very tightly packaged, in a soft but three-dimensionally shaped cover 9 which has a stable shape, in practically any configuration. The method thus permits the manufacture of compact airbag units which can be mounted in previously difficult areas of a motor vehicle.

In some embodiments it may be considered advantageous to interconnect the edge regions of the cover 9 to one another mechanically, in order to provide a more secure airbag unit 21. One way of doing this will now be described with reference to FIGS. 16 to 19.

FIG. 16 corresponds generally to FIG. 2, and it will therefore be noted that the drawing illustrates the folded and/or rolled airbag package 8 enclosed within the flexible cover 9 to create the intermediate package 10. However, in this configuration it will be noted that the respective edge regions 24, 25 of the cover 9 are aligned and superimposed rather than left to lie loosely against one another in an overlapping relationship as described above and shown in FIG. 2. The edge regions 24, 25 of the cover 9 can be aligned and superimposed in this manner along their entire length, or alternatively just along the length of outwardly directed tabs 24a, 25a formed at the edges, as illustrated in FIG. 17. The superimposed edge regions 24, 25, or tabs 24a, 25a may be held in position against one another by a simple tack stitch or the like in order to prevent the package 8 and the cover 9 from unravelling, noting that any such tack stitch will not contribute significantly to the integrity of the finished airbag unit.

FIG. 17 shows the intermediate package 10, with its aligned and superimposed edge tabs 24a, 25a after it has been placed inside the mould cavity 16 of the press member 15. As will be noted, the superimposed tabs 24a, 25a project outwardly from the main part of the mould cavity 16 so as to overlie a pair of smaller spaced-apart recesses 26 provided adjacent the main mould cavity 16. It is to be noted, however, that more or fewer than two recesses 26 of this type could be provided.

The press apparatus 20 will then be actuated in a similar manner to that proposed and described above, such that the intermediate package 10 will be simultaneously heated and pressed. However, in this embodiment, the upper press member 19 of the press apparatus 20 will carry one or more projections (of equal number and similar arrangement to the recesses 26), each of which is sized and shaped to be received within a respective said recess 26 in the lower press member 15. As the press apparatus 20 is thus actuated, the material of the superimposed edge regions 24, 25, or edge tabs 24a, 25a of the cover 9 of the intermediate package 10 will be deformed into the recesses 26, thereby creating respective clinch-type joints 27 between the two superimposed layers of cover material, as illustrated in FIG. 18 which shows the resulting compressed package 21.

FIG. 19 illustrates the form of each clinch joint 27, in schematic cross-sectional view. As will be noted, a re-entrant depression 28 is formed in each edge or tab layer, with both layers remaining in intimate contact with one another. The depression 28 is shaped, by the press projections and the cooperating recesses 26, such that it is wider at its base than at its top. Each layer of material is thus caused to follow a tortuous path across the depression, which serves to mechanically interconnect the edges regions 24, 25, or tabs 24a, 25a, thereby ensuring that the cover 9 will be securely held around the airbag package 8 in the finished compressed package 21.

Whilst the present invention has been described above with particular reference to a side airbag, it is to be appreciated that it can be embodied in airbags of other types and configurations. For example, it has been found that packaging side-curtain airbags in covers 9 of the type disclosed herein offers significant advantages over previously proposed soft airbag covers. Side curtain airbags are typically very long and are tightly rolled and so also narrow. They can be subject to twist when they are installed in the roof lining of a motor vehicle which can adversely affect the inflation characteristic of the airbag. It has been found that by wrapping at least parts of the side-curtain airbag in a cover 9 of the type proposed above, the resulting airbag unit may be significantly less susceptible to twist upon installation in a motor vehicle. The present invention may also be advantageous for large and bulky airbags which must be carefully shaped and packaged in to be fitted into position in a motor vehicle such as, for example, double-folded inflatable curtains, or the region of an airbag where it is connected to an inflator. In these types of installation, there are typically many layers of fabric which become superimposed when the airbag is folded, and which are thus difficult to maintain in a stable and compact shape.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An airbag unit for a motor vehicle safety device, the airbag unit comprising:
   an inflatable airbag formed of a flexible material, the inflatable airbag in an uninflated condition selected from a group consisting of a rolled and a folded condition; and
   a cover holding the inflatable airbag in the uninflated condition under compression,
   wherein the cover is formed of a moulded pulp material, compresses the inflatable airbag in the uninflated condition and cooperates with the inflatable airbag to define a compressed package having a predetermined stable shape in the uninflated condition, and
   wherein the cover completely extends around at least part of the inflatable airbag in the uninflated condition and independently maintains the predetermined stable shape of the compressed package.

2. The airbag unit according to claim 1, wherein the moulded pulp material is derived from at least one renewable source.

3. The airbag unit according to claim 1, wherein the moulded pulp material comprises cellulose fibres.

4. The airbag unit according to claim 1, wherein the moulded pulp material comprises recycled paper.

5. The airbag unit according to claim 1, wherein the moulded pulp material comprises natural fibres.

6. The airbag unit according to claim 1, wherein the cover contains no polymeric material.

7. The airbag unit according to claim 1, wherein the cover has a water-resistant or water-proof coating.

8. The airbag unit according to claim 1, wherein the cover is substantially devoid of moisture.

9. The airbag unit according to claim 1, wherein the cover substantially completely encapsulates the inflatable airbag.

10. The airbag unit according to claim 9, wherein the moulded pulp material of the cover completely encapsulates the inflatable airbag.

11. The airbag unit according to claim 1, wherein the moulded pulp material of the cover completely extends around at least part of the inflatable airbag in the uninflated condition.

12. The airbag unit according to claim 1, wherein the moulded pulp material of the cover completely extends peripherally around at least part of the inflatable airbag in the uninflated condition.

13. A method of packaging an airbag for a motor vehicle safety device, the method comprising:
    providing an inflatable airbag formed of flexible sheet material;
    rolling and/or folding the airbag; and
    providing a cover of moulded pulp material around at least part of the rolled and/or folded airbag via simultaneous application of heat and pressure to form a compressed package having a stable shape defined by the moulded pulp material.

14. The method according to claim 13, further including:
    at least partially enclosing the rolled and/or folded airbag within an initially flexible cover formed of semi-pulp material containing moisture to form an intermediate package; and
    then simultaneously heating and pressing the intermediate package to eliminate the moisture and impart the stable shape to a resulting compressed package.

15. The method according to claim 14, further including placing the intermediate package in a mould cavity prior to the step of simultaneously heating and pressing the intermediate package, and wherein the step of simultaneously heating and pressing is performed on the intermediate package within the mould cavity.

16. The method according to claim 15, further including applying a vacuum to the mould cavity during the step of simultaneously heating and pressing.

17. The method according to claim 13, wherein the moulded pulp material is derived from at least one renewable source.

18. The method according to claim 13, wherein the moulded pulp material comprises cellulose fibres.

19. The method according to claim 13, wherein the moulded pulp material comprises recycled paper.

20. The method according to claim 13, wherein the moulded pulp material comprises natural fibres.

* * * * *